United States Patent
Takahashi et al.

(10) Patent No.: US 7,255,957 B2
(45) Date of Patent: Aug. 14, 2007

(54) NON-AQUEOUS ELECTROLYTE CELL AND SOLID ELECTROLYTE CELL

(75) Inventors: Kimio Takahashi, Miyagi (JP); Mamoru Hosoya, Kanagawa (JP); Masami Miyake, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/969,220

(22) Filed: Oct. 2, 2001

(65) Prior Publication Data
US 2003/0143465 A1   Jul. 31, 2003

(30) Foreign Application Priority Data
Oct. 5, 2000   (JP) ............. P2000-306877

(51) Int. Cl.
  *H01M 4/58*  (2006.01)
  *H01M 4/62*  (2006.01)
  *H01M 2/14*  (2006.01)
(52) U.S. Cl. ............ 429/94; 429/221; 429/231.1
(58) Field of Classification Search ........... 423/306; 429/218.1, 231.1, 221, 94
See application file for complete search history.

(56) References Cited

U.S. PATENT DOCUMENTS

| | | | |
|---|---|---|---|
| 5,443,925 A | * | 8/1995 | Machida et al. ........... 429/94 |
| 5,910,382 A | * | 6/1999 | Goodenough et al. ... 429/218.1 |
| 6,054,233 A | * | 4/2000 | Vourlis .................. 429/61 |
| 6,190,426 B1 | | 2/2001 | Thibault et al. |
| 6,528,033 B1 | * | 3/2003 | Barker et al. ............ 423/306 |
| 2002/0192137 A1 | * | 12/2002 | Chaloner-Gill et al. ..... 423/306 |

FOREIGN PATENT DOCUMENTS

WO   WO 97/40541   10/1997

OTHER PUBLICATIONS

Linden, editor, "Handbook of Batteries, Third edition", McGraw Hill, 2002, pp. A.1-A.3.*

* cited by examiner

*Primary Examiner*—Gregg Cantelmo
(74) *Attorney, Agent, or Firm*—Sonnenschein Nath & Rosenthal LLP (57) ABSTRACT

A non-aqueous electrolyte cell is provided having improved cell characteristics and which maintains a cell shape encapsulated in a laminate film even when overdischarged to a cell voltage of 0 V. The cell includes an anode, an electrolyte, and a cathode containing a compound having the formula $Li_xFe_{1-y}M_yPO_4$, wherein $0.05 \leq x \leq 1.2$ and $0 \leq y \leq 0.8$, and wherein M is at least one element selected from the group consisting of Mn, Cr, Co, Cu, Ni, V, Mo, Ti, Zn, Al, Ga, Mg, B and Nb. Exposed portions of an anode current collector and a cathode current collector prevent internal shorting of the cell.

17 Claims, 3 Drawing Sheets

NON-AQUEOUS ELECTROLYTE CELL AND SOLID ELECTROLYTE CELL

RELATED APPLICATION DATA

The present application claims priority to Japanese Application(s) No(s). P2000-306877 filed Oct. 5, 2000, which application(s) is/are incorporated herein by reference to the extent permitted by law.

BACKGROUND OF THE INVENTION

This invention relates to a non-aqueous electrolyte cell and to a solid electrolyte cell. More particularly, it relates to a cathode and an anode representing cell components of a non-aqueous electrolyte cell and a solid electrolyte cell. Recently, with drastic progress in the art of electronic equipment, investigations into rechargeable secondary cells, as a power source usable conveniently and economically for prolonged period of time, are proceeding briskly. Known secondary cells include lead storage cells, alkali storage cells, and non-aqueous electrolyte secondary cells. A particular non-aqueous electrolyte secondary cell, namely, a lithium-ion secondary cell possesses certain advantages over other types of secondary cells including high output and high energy density. Lithium-ion secondary cells include a cathode and an anode wherein each have an active material capable of reversibly doping/undoping lithium ions. Lithium-ion secondary cells also include a non-aqueous electrolyte such as a non-aqueous electrolyte solution or a solid electrolyte.

Typical anode active materials include metal lithium, lithium alloys, such as Li—Al alloys, lithium-doped electrically-conductive high molecular weight materials, such as polyacetylene or polypyrrole, interlayer compounds in which the crystals of lithium ions are captured, and carbon materials. Typical cathode active materials include metal oxides and metal sulfides or polymers, such as $TiS_2$, $MoS_2$, $NbSe_2$ or $V_2O_5$.

The discharging reaction of a lithium-ion secondary cell proceeds as lithium ions are deintercalated into an electrolyte solution at the cathode and are intercalated into the anode active material. During charging, a reaction opposite to the charging reaction proceeds, such that lithium ions are intercalated at the cathode. Thus, charging/discharging reactions are repeated as the entrance or exit of lithium ions from the cathode into and from the anode occurs repeatedly.

Known cathode active materials used in lithium-ion secondary cells include $LiCoO_2$, $LiNiO_2$ and $LiMnO_4$ which are preferably used because these materials have both high energy density and high voltage. However, these cathode active materials, containing metal elements of low Clark number in their composition, suffer from high cost and difficulties met in connection with supply in stability. Moreover, these cathode active materials are higher in toxicity and have a significant negative effect on the environment. Thus, a need exists in the art for a cathode active material that does not present these disadvantages, but still possesses both high energy density and high voltage.

In response to this need, a compound having an olivinic structure and the formula $Li_xFe_{1-y}M_yPO_4$ wherein $0.05 \leq x \leq 1.2$ and $2.0 \leq y \leq 0.8$, and wherein M is at least one element selected from the group consisting of Mn, Cr, Co, Cu, Ni, V, Mo, Ti, Zn, Al, Ga, Mg, B and Nb, has been proposed for use as a cathode active material. This compound may be used alone or in combination with other materials. Advantages associated with the $Li_xFe_{1-y}M_yPO_4$ compound include the presence of iron therein. Iron is an inexpensive material that is plentiful in supply, and is therefore less costly than $LiCoO_2$, $LiNiO_2$ or $LiMnO_4$. Moreover, $Li_xFe_{1-y}M_yPO_4$ is lower in toxicity and has less negative impact on the environment than $LiCoO_2$, $LiNiO_2$, $LiMnO_4$ and the like.

However, when $Li_xFe_{1-y}M_yPO_4$ is used as the cathode active material, and charging/discharging of the cell is carried out repeatedly, the charging/discharging capacity of the cell is decreased appreciably due to internal shorting. After the $30^{th}$ cycle in a lithium-ion secondary cell wherein $Li_xFe_{1-y}M_yPO_4$ is employed as the cathode active material, the electrical capacity falls to 50% or less of the initial electrical capacity. This significant decrease in electrical capacity is caused by volumetric changes that are produced in the cathode and anode as a result of cell reactions occurring in the course of charging/discharging. These volumetric changes are produced in those portions of the cathode and anode that contribute to cell reaction. In addition, those portions of the cathode and anode that do not contribute to cell reaction are also subjected to stress caused by the volumetric changes in the cell-reaction portions of the cathode and anode. This stress can result in the detachment of the active materials from the cathode and anode current collectors. This detachment, in turn, causes internal shorting of the cell device.

If, in a lithium-ion secondary cell, the cathode and anode are layered and coiled together to form a generally spirally-wound cell, the innermost portions of the cathode and anode face each other and have the same polarity. The outermost portions of the cathode and anode face an exterior material or casing. The result of this configuration is that the innermost and outermost portions of the cathode and anode do not contribute to the cell reaction.

When used as a cathode active material, $Li_xFe_{1-y}M_yPO_4$ undergoes larger volumetric changes than other potential active materials. In particular, the portions of the cathode and anode that contribute to cell reaction suffer from volumetric changes that may be as high as approximately 7%. These high volumetric changes can also create larger stress on those portions of the cathode and anode that do not contribute to the cell reaction resulting in a substantial increase of internal shorting occurrences. Thus, optimum cell cyclic characteristics cannot be achieved when $Li_xFe_{1-y}M_yPO_4$ is used as the cathode active material. Moreover, the electrical capacity of a cell using $Li_xFe_{1-y}M_yPO_4$ as a cathode active material is smaller than that of prior art active materials and the cell size required to accommodate the active material is much larger than when prior art active materials are used. Nevertheless, $Li_xFe_{1-y}M_yPO_4$ is very desirable in other respects, namely, the energy density per unit volume of $Li_xFe_{1-y}M_yPO_4$ is lower than that of Co-, Ni- or Mn-based active materials. Accordingly, there is a need in the art for a secondary cell employing $Li_xFe_{1-y}M_yPO_4$ as a cathode active material that does not have the disadvantages discussed above.

BRIEF SUMMARY OF THE INVENTION

It is therefore an object of the present invention to provide a non-aqueous electrolyte cell and a solid electrolyte cell that, with $Li_xFe_{1-y}M_yPO_4$ as the cathode active material, suppresses internal shorting thereby improving the cyclic characteristics of the cell. It is a further object of the invention to provide a cell having constant electrical capacity and a reduced size and thickness than prior cells. Finally, a high capacity cell having a fixed outer shape is also provided.

In a first embodiment, the non-aqueous electrolyte cell of present invention includes a cathode, an anode, a separator, and an electrolyte solution. The cathode includes a strip-shaped cathode current collector upon which is deposited a cathode active material. The cathode active material is a compound having an olivinic crystal structure and the formula $Li_xFe_{1-y}M_yPO_4$, wherein $0.05 \leq x \leq 1.2$ and $0 \leq y \leq 0.8$ and M is at least one element selected from the group consisting of Mn, Cr, Co, Cu, Ni, V, Mo, Ti, Zn, Al, Ga, Mg, B and Nb. The active material compound may be used alone or in combination with other materials. The anode includes an anode current collector upon which is deposited an anode active material. A separator is also provided and acts to separate the cathode and the anode from each other. The cathode and anode with the separator therebetween are layered and coiled together to form a circular or an elliptical spiral such that the anode and cathode face both the outer casing of the cell as well as the inner core. The cell of the present invention also includes an exposed portion on each of the cathode and anode current collectors. In particular, the active material is not applied to one face of an end portion of the cathode current collector such that the exposed portion faces the inner surface of the cell casing or other outer material. Further, the active material is not applied to an inner face of a beginning portion of the anode current collector within the core such that the exposed portion faces the anode current collector.

In another aspect, the present invention provides a solid electrolyte cell including a solid electrolyte and a cathode having a cathode current collector upon which is deposited a cathode active material formed of a compound of an olivinic crystal structure having the formula $Li_xFe_{1-y}M_yPO_4$ wherein $0.05 \leq x \leq 1.2$ and $0 \leq y \leq 0.8$, and wherein M is at least one element selected from the group consisting of Mn, Cr, Co, Cu, Ni, V, Mo, Ti, Zn, Al, Ga, Mg, B and Nb. The solid electrolyte cell of the present invention also includes an anode having an anode current collector upon which is deposited an anode active material. The cathode and anode are layered and coiled together so that the anode and cathode form a circular or elliptical spiral that can be encapsulated within an exterior material. The cell of the present invention also includes an exposed portion on each of the cathode and anode current collectors. In particular, the active material is not applied to one face of an end portion of the cathode current collector such that the exposed portion faces the inner surface of the cell casing or other outer material. Further, the active material is not applied to an inner face of a beginning portion of the anode current collector within the core such that the exposed portion faces the anode current collector.

The outermost portion of the cathode that faces the interior surface of the cell casing or exterior material does not contribute to cell reaction in the non-aqueous electrolyte cell or the solid electrolyte cell of the present invention. Furthermore, the spiral formation of the cell causes the innermost portion of the anode, located within the core of the cell, to face itself thereby providing two surfaces of the same polarity that do not contribute to cell reaction. The spiral formation in conjunction with the exposed portions of the anode and cathode current collectors wherein those portions do not contribute to cell reaction combine to resist the stress applied thereto by repeatedly charging and discharging the cell and, because no active material is present on the exposed portions of the cathode and anode, there is no risk of the active material becoming detached and falling off. Accordingly, internal shorting is prevented and the cyclic characteristics of the cell of the present invention are improved. Moreover, according to the present invention, since the active material not contributing to cell reaction is not deposited on the current collector, the outer size or thickness of the cell is reduced, or the amount of the active material contributing to the cell reaction can be increased, with the outer shape of the cell remaining unchanged, thus enabling a high electrical capacity.

BRIEF DESCRIPTION OF SEVERAL VIEWS OF THE DRAWING

FIG. 2 illustrates a cathode in accordance with the present invention wherein FIG. 3 illustrates an anode in accordance with the present invention wherein

DETAILED DESCRIPTION OF THE INVENTION

Referring to the drawings, preferred embodiments of the present invention will be explained in detail. In a first embodiment, a non-aqueous electrolyte cell employing an electrolyte solution as the non-aqueous electrolyte is used to exemplify the present invention.

Figure 1:
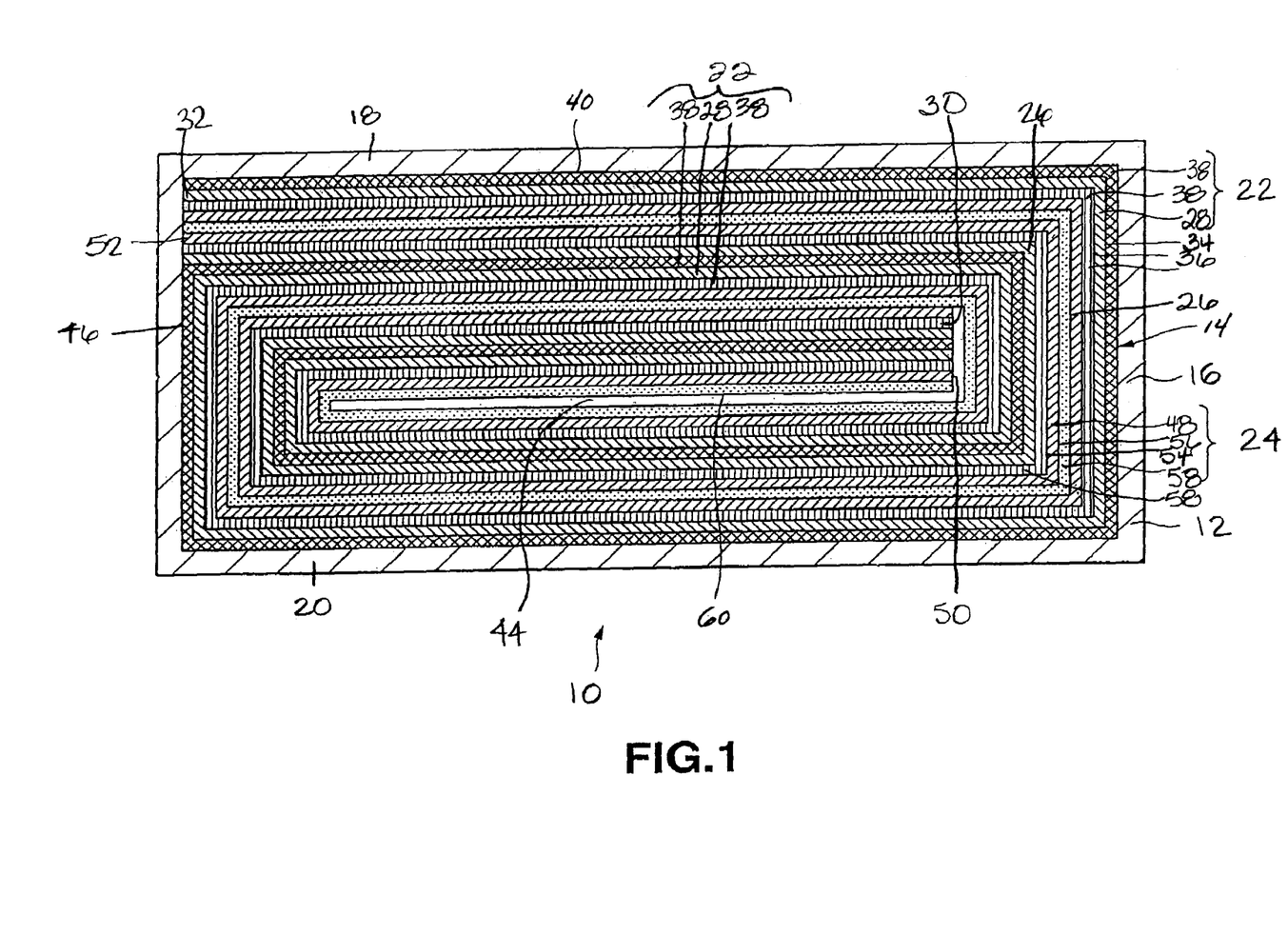
FIG. 1 is a longitudinal cross-sectional view of a non-aqueous electrolyte cell embodying the present invention.

Referring now to FIG. 1, the non-aqueous electrolyte cell 10 of the present invention comprises a casing 12 and a cell device 14. As shown in FIG. 1, casing 12 is generally rectangular, but may also be cylindrical, square or any other suitable shape for a secondary cell. In a first embodiment, casing 12 includes a first side wall 14, a second side wall 16, a top wall 18 and a bottom wall 20. Walls 14, 16, 18 and 20 are configured to encapsulate cell device 14 and a non-aqueous electrolyte 16. Non-aqueous electrolyte 16 may be either a solution or a solid. When non-aqueous electrolyte 16 is a solution, casing 12 may be an iron cell can, lined with an inner plating. If a solid electrolyte is used as non-aqueous electrolyte 16, casing 12 may be a flexible multi-layered laminate film.

Any non-aqueous electrolyte solution obtained by dissolving an electrolyte in a non-protonic non-aqueous solvent may be used in accordance with the present invention. As the non-aqueous solvent, use may be made of, for example, propylene carbonate, ethylene carbonate, butylene carbonate, vinylene carbonate, γ-butyl lactone, sulforan, 1,2-dimethoxyethane, 1,2-diethoxyethane, 2-methyl tetrahydrofuran, 3-methyl-1,3-dioxolane, methyl propionate, methyl butyrates, dimethyl carbonate, diethyl carbonate, or dipropyl carbonate. In particular, from the perspective of voltage stability, cyclic carbonates, such as propylene carbonate, ethylene carbonate, butylene carbonate or vinylene carbonate, and chained carbonates, such as dimethyl carbonate, diethyl carbonate or dipropyl carbonate, may preferably be used. These non-aqueous solvents may be used either singly or in combination. The electrolytes dissolved in the non-aqueous solvent may be lithium salts, such as $LiPF_6$, $LiClO_4$, $LiAsF_6$, $LiBF_4$, $LiCF_3SO_3$ and $LiN(CF_3SO_2)_2$. Of these lithium salts, $LiPF_6$ or $LiBF_4$, in particular, are preferably employed.

As the solid electrolyte, an inorganic solid electrolyte, a high molecular weight solid electrolyte, or a gelated electrolyte, may be used as the solid electrolyte provided that the material used exhibits lithium ion conductivity. The high molecular weight solid electrolyte is composed of an electrolyte salt and a high molecular weight compound capable of dissolving the salt. As the high molecular weight compound, an ether-based high molecular material, such as poly(ethylene oxide) or an cross-linked product thereof, a poly(methacrylate) ester-based high molecular weight material or an acrylate-based high molecular weight material, may be used either singly, as a copolymer in the molecules, or as a mixture. In this case, as a matrix of the gelated electrolyte, any of a variety of high molecular weight materials that may be gelated on absorption of the non-aqueous electrolyte solution may be used. These high molecular weight materials may be exemplified by fluorine-based high molecular weight materials, such as poly (vinylidene fluoride), poly (vinylidene fluoride-CO-hexafluoropropylene), ether-based high molecular weight materials, such as poly (ethylene oxide) or cross-linked products thereof, and polyacrylonitrile. Of these, the fluorine-based high molecular weight materials are particularly desirable due to their redox stability.

It should be noted that, in a solid electrolyte cell employing a solid electrolyte as the non-aqueous electrolyte, an electrolyte layer formed of a solid electrolyte may be provided on at least one surface of each of cathode 18 and anode 20 instead of using separator 22 in order to separate cathode 18 and anode 20 from each other, with cathode 18 and anode 20 being layered and coiled together to form the cell device 14 so that the electrolyte layer will be placed between the layers of cathode active material and anode active material which will be further described below.

Cell device 14 comprises a cathode 22, an anode 24, and a separator 26. Referring now to FIGS. 1 and 2, cathode 22 comprises a generally strip-shaped cathode current collector 28 having magneto-optical discs thereon (not shown). Current collector 28 is preferably made of an aluminum foil and is generally flat and strip-shaped. Current collector 28 includes a beginning end 30, a terminating end 32, an outer face 34, an inner face 36, a cathode active material 38, an exposed portion 40, and a lead 42. Current collector 28 is generally spirally-wound or -coiled such that beginning end 30 is located generally centrally within a core 44 of cell device 14 and terminating end 28 is located generally at the top of an inner face 46 of first side wall 14. Cathode lead 38 is preferably mounted or coupled to current collector 28 in the vicinity of beginning end 30.

Figure 2A:
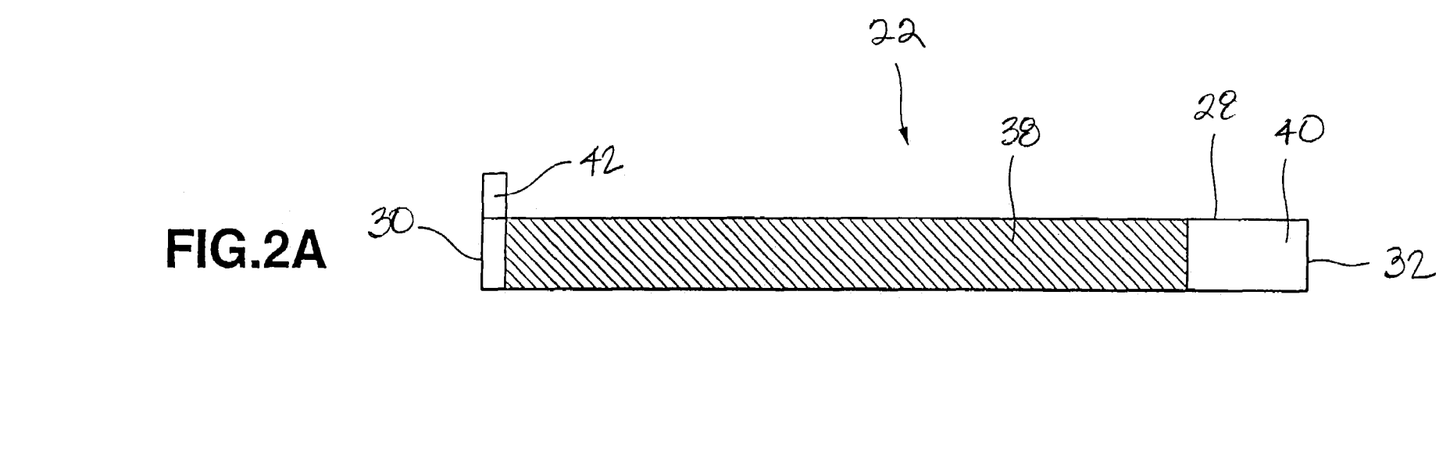
FIG. 2a shows a first face of the cathode and FIG. 2b shows a second face of the cathode.
Figure 2B:
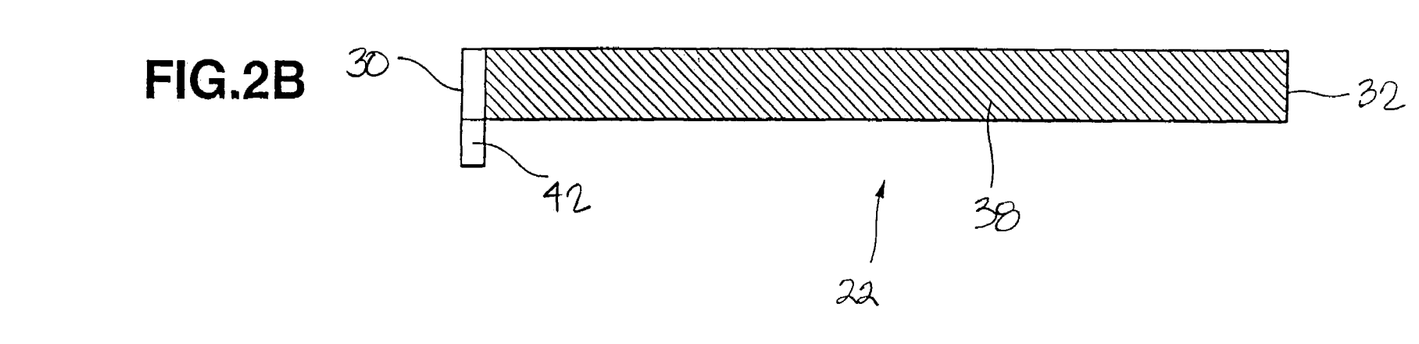

Referring now to FIGS. 2a and 2b, a layer of cathode active material 38 is applied to or formed on each magneto-optical disc (not shown) on faces 34 and 36 of cathode current collector 28 except at exposed portion 40 wherein current collector 38 remains exposed. In particular, exposed portion 40 is located at position 2c near to terminating end 32, as shown in FIGS. 1 and 2, such that exposed portion 40 faces the inner face of top wall 18. Cathode active material 38 is preferably capable of both electrically emitting and occluding lithium. A preferred active material 38 is a compound with an olivinic structure having the formula $Li_xFe_{1-y}M_yPO_4$, wherein $0.05 \leq x \leq 1.2$ and $2.0 \leq y \leq 0.8$ and wherein M is at least one element selected from the group consisting of Mn, Cr, Co, Cu, Ni, V, Mo, Ti, Zn, Al, Ga, Mg, B and Nb and may be used either alone or in combination with another compound(s). Active material 38 also includes a binder. Any suitable resin materials routinely used as binder in non-aqueous electrolyte cells may be used.

In a preferred embodiment of the present invention, active material 38 is a composite compound composed of $LiFePO_4$ and a carbon material. More specifically, the composite compound is comprised of a plurality of grains or particles of a carbon material attached to the surface of $LiFePO_4$ grains or particles. The carbon material grain size is significantly smaller than that of the $LiFePO_4$ grains and the carbon material is electrically-conductive. By combining $LiFePO_4$ with an electrically-conductive carbon material, the electrical conductivity of the composite material is higher than if active material 38 was composed of $LiFePO_4$ alone. In other words, the electrical conductivity of active material 38 may be significantly improved and electrical capacity maximized by attaching carbon material particles to the surface of $LiFePO_4$ particles. Thus, by using the $LiFePO_4$-carbon composite material as active material 38, the non-aqueous electrolyte cell 10 of the present invention can realize much higher electrical capacity than conventional lithium-ion secondary cells. The carbon content per unit weight of the $LiFePO_4$-carbon composite material is preferably not less than 3 wt % because a lesser amount would not provide enough carbon material grains or particles for attachment to $LiFePO_4$ particles and an improvement in electrical conductivity of the cathode would not be achieved.

The preferred carbon material has a strength to area ratio A(D/G) of not less than 0.3 wherein A(D/G) is the background-free Raman spectrum strength area ratio of the D peak appearing at the number of waves of 1340 to 1360 $cm^{-1}$ in the Raman spectrum of graphite (Gr) to the G peak appearing at the number of waves of 1570 to 1590 $cm^{-1}$ as measured by Raman spectrometry as shown in FIG. 2. The "background-free" is synonymous with freeness from a noisy portion.

Among numerous peaks of the Raman spectrum of Gr, two peaks, namely the G peak appearing at the number of waves of 1570 to 1590 $cm^{-1}$ and the D peak appearing at the number of waves of 1340 to 1360 $cm^{-1}$, are observed, as described above. Of these, the D peak is inherently not derived from the G peak, but is a Raman-inactive peak appearing when the structure is distorted and the structural symmetry has become lower. Thus, it is known that the D peak is a measure of structural distortion, and that the strength area ratio A(D/G) of the D to G peaks is correlated linearly with a reciprocal of the crystallite size La along the a-axis of Gr. The preferred carbon material is an amorphous carbon material such as acetylene black.

The carbon material having the strength to area ratio A(D/G) of not less than 0.3 may be obtained, for example, by processing the carbon material by comminution with a pulverizer. The carbon material is readily produced by controlling the comminuting time. For example, graphite, as a crystalline carbon material, may have its structure destructed easily by comminution with a powerful pulverizer, such as a planetary ball mill. The carbon material is amorphized progressively resulting in increased strength to area ratio A(D/G) by means of controlling the driving time of the pulverizer. That is, by controlling the driving time of the pulverizer, such a carbon material having an optional A(D/G) not less than 0.3 may be produced extremely readily. Thus, on comminution, crystalline carbon materials may also be used.

In addition to determining the strength to area ratio of the carbon material, the powder density of the $LiFePO_4$-carbon composite material is also measured and is preferably not less than 2.2 g/cm³. If the powder density of the $LiFePO_4$-carbon composite material is less than 2.2 g/cm³, the composite material is not compressed sufficiently and improvement in the active material charging ratio of cathode 22 is not shown. In order to provide a $LiFePO_4$-carbon composite material with a powder density of not less than 2.2 g/cm$^3$, the starting materials of the composite material are heavily milled thereby confirming that the composite material has been comminuted sufficiently. By using LiFePO$_4$-carbon composite material with a powder density of not less than 2.2 g/cm$^3$, as the cathode active material 38, the charging density of the cathode is significantly improved thereby non-aqueous electrolyte cell 10 having a high electrical capacity in accordance with the present invention.

A further advantage is realized when the LiFePO$_4$-carbon composite material is comminuted to satisfy the above-mentioned powder density. In particular, the specific surface area of LiFePO$_4$ is also increased thereby yielding a larger contact area for attachment of the carbon material particles to the LiFePO$_4$ particles resulting in improved electrical conductivity. The Bullnauer Emmet Teller (BET) specific surface area of the LiFePO$_4$-carbon composite material is preferably not less than 10.3 m$^2$/g in. When the specific surface area of the LiFePO$_4$-carbon composite material is not less than 10.3 m$^2$/g, the specific surface area of LiFePO$_4$ particles per unit area is sufficiently large to increase the contact area of the LiFePO$_4$ particles with the carbon material thereby improving the electrical conductivity of cathode active material 38.

Additionally, the preferred primary grain size of the LiFePO$_4$-carbon composite material is not larger than 3.1 μm. When the primary grain size of the LiFePO$_4$-carbon composite material is not larger than 3.1 μm, the specific surface area of the LiFePO$_4$ particles per unit area is large enough to increase the contact area of LiFePO$_4$ particles with the carbon material particles. The result is again the improved electrical conductivity of cathode active material 38.

In a preferred embodiment, the LiFePO$_4$-carbon composite material is used as cathode active material 38. However, the present invention is not limited thereto. In another embodiment, LiFePO$_4$ by itself may be used as cathode active material 38. Other suitable compounds include a compound having the formula Li$_x$Fe$_{1-y}$M$_y$PO$_4$, but not LiFePO$_4$, wherein $0.05 \leq x \leq 1.2$ and $2.0 \leq y \leq 0.8$ and wherein M is at least one element selected from the group consisting of Mn, Cr, Co, Cu, Ni, V, Mo, Ti, Zn, Al, Ga, Mg, B and Nb. The compound may be used alone or in combination with other materials. Preferred compounds include LiFe$_{0.2}$Mn$_{0.8}$PO$_4$, LiFe$_{0.2}$Cr$_{0.8}$PO$_4$, LiFe$_{0.2}$CO$_{0.8}$PO$_4$, LiFe$_{0.2}$Cu$_{0.8}$PO$_4$, LiFe$_{0.2}$Ni$_{0.8}$PO$_4$, LiFe$_{0.25}$V$_{0.75}$PO$_4$, LiFe$_{0.25}$Mo$_{0.75}$PO$_4$, LiFe$_{0.25}$Ti$_{0.75}$PO$_4$, LiFe$_{0.3}$Zn$_{0.7}$PO$_4$, LiFe$_{0.3}$Al$_{0.7}$PO$_4$, LiFe$_{0.3}$Ga$_{0.7}$PO$_4$, LiFe$_{0.25}$Mg$_{0.75}$PO$_4$, LiFe$_{0.25}$B$_{0.75}$PO$_4$ and LiFe$_{0.25}$Nb$_{0.75}$PO$_4$.

Figure 3A:
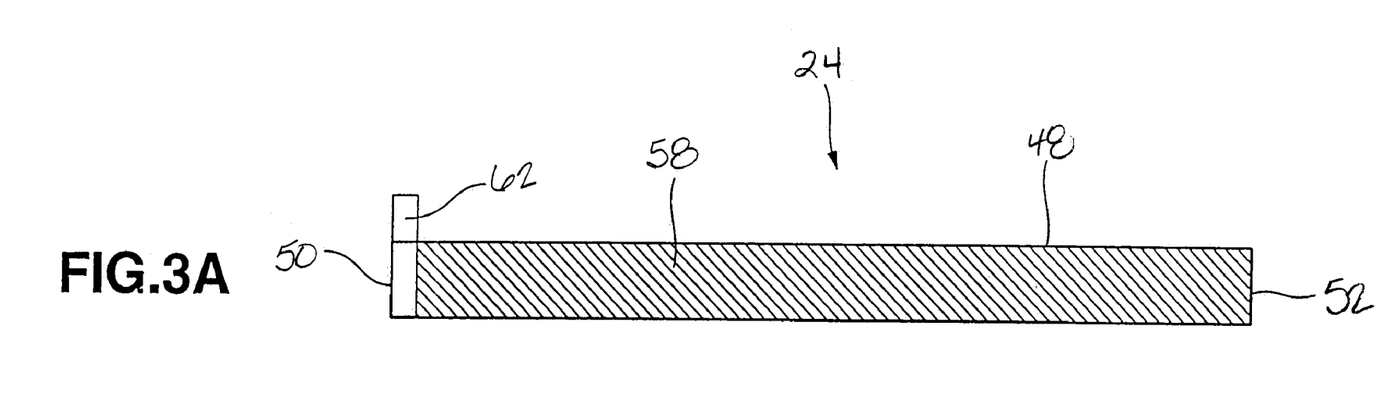
FIG. 3a shows a first face of the anode and FIG. 3b shows a second face of the anode.
Figure 3B:
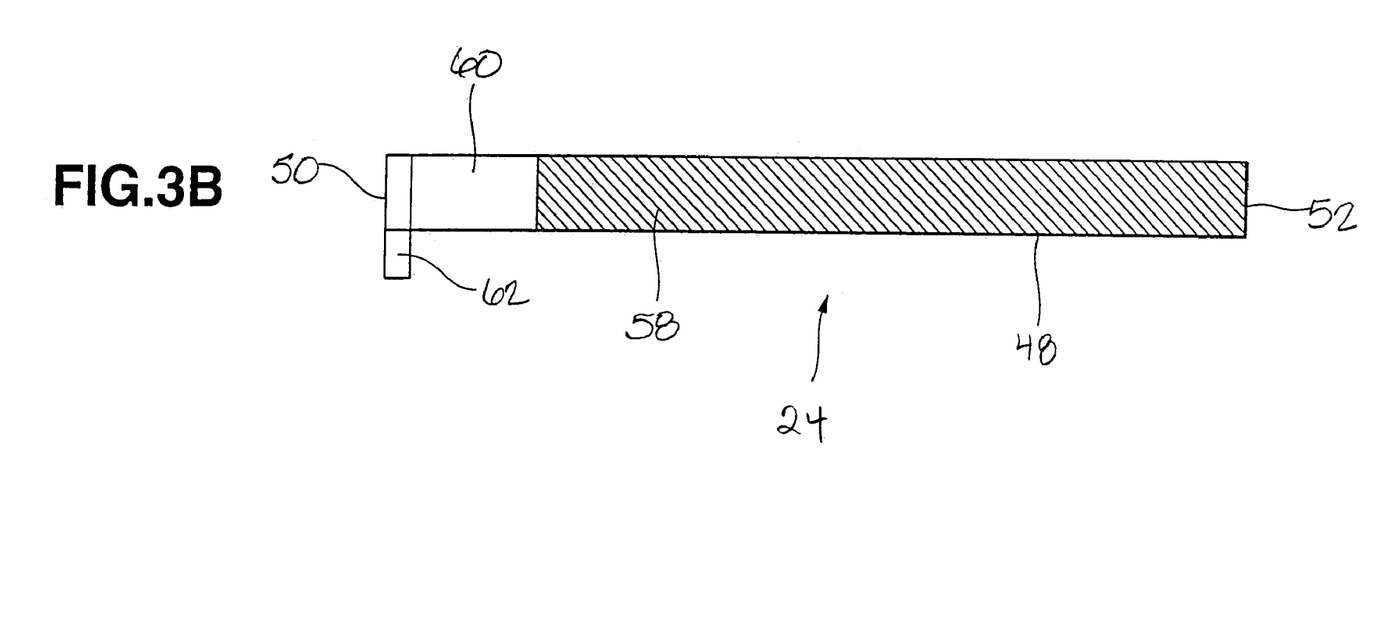

Referring now to FIGS. 1 and 3, anode 24 includes an anode current collector 48. Current collector 48 is generally flat and strip-shaped and comprises a beginning end 50, a terminating end 52, an inner face 54, an outer face 56, an anode active material 58, an exposed portion 60, and a lead 62. Current collector 48 is preferably made of a nickel foil or the like. In a preferred embodiment, current collector 48 is generally spirally-wound or coiled such that beginning end 50 is located generally centrally within a core 44 of cell device 14 and terminating end 52 is located generally at the top of inner face 46. Anode lead 62 is preferably mounted or coupled to current collector 48 in the vicinity of beginning end 50.

A layer of an anode active material 58 is formed on faces 54 and 56 of anode current collector 48 except at location 3c near beginning end 50 such that exposed portion 60 is created. The preferred active material 58 is a material that is capable of doping and undoping lithium including, for example, lithium, metal lithium, lithium alloys, lithium-doped electrically-conductive high molecular weight materials, carbon materials and layered compounds, such as metal oxides. Active material 58 may also include a suitable binder, such as resin materials, that are routinely used as a binder in non-aqueous electrolyte cells.

Separator 26 is generally flat and strip-shaped and is used for separating cathode 22 and anode 24. Separator 26 may be made of any suitable material commonly used as a separator for non-aqueous electrolyte cells. For example, the separator may be a film of a high molecular weight material, such as polypropylene. Moreover, separator 26 is preferably very thin and more preferably not larger than 50 μm so as not to impede the lithium-ion conductivity and energy density of cathode 22 and anode 24. Referring now to FIG. 1, cathode 22 and anode 24 are layered together with separator 26 therebetween such that outer face 34 of cathode 22 is disposed along the inner face of walls 14, 16, 18 and 20. Cathode 22, anode 24, and separator 26 are spirally-wound or coiled together a plurality of times beginning at core 44 to form a generally circular or elliptical spiral. As a result of this coiling, anode 24 folds at core 44 in such a way that inner face 54a faces inner face 54b and exposed portion 60 faces inner face 54b. The portions of cathode 22 that are disposed along the inner face of walls 14, 16, 18 and 20 as well as the portions of anode 24 that face each other, as described above, do not contribute to the cell reaction. These portions of cell 10 are susceptible to stress caused by volumetric changes produced during charging/discharging in the portions of cell 10 where cathode 22 and anode 24 face one another such as at locations 64 and 66. The present invention, however, provides exposed current collector portions 40 and 60 that, because they do not have active materials 38 and 58 formed thereon, are not at risk for detachment of active material therefrom. Thus, if stress is applied to the non-reactive portions of cell 10 caused by volumetric changes during charge/discharge of cell 10, the presence of exposed portions 40 and 60 prevents detachment of active material 38 and 58 from current collectors 28 and 48 thereby preventing internal shorting of cell 10. Cyclic characteristics of cell 10 are therefore dramatically improved. Further, because there is no active material 38 or 58 formed upon exposed portions 40 and 60, cell 10 itself is reduced in both size and thickness. However, those portions of cathode 22 and anode 24 that contribute to cell reaction have thicker layers of active material 38 and 58 in order to realize higher electrical capacity.

A method for making the non-aqueous electrolyte cell 10 of the present invention is now described. First, cathode active material 38 is synthesized by mixing or kneading, milling and sintering an LiFePO4 starting material such as Li3PO4, Fe3(PO4)2 or its hydrate Fe3(PO4)2 nH2O, wherein n is the number of hydrates. Second, during or following mixing of the starting material, a carbon material may then be added to form a mixture. This mixture is then milled by a milling process to form a milled mixture which is then fired by way of a sintering process.

In the mixing process, lithium phosphate and iron(II) phosphate octahydrate are first mixed together at a predetermined ratio. A carbon material is then added to form a mixture. The iron(II) phosphate octahydrate, when used as a starting material for synthesis of active material 38, is synthesized by adding disodium hydrogen phosphate dodecahydrate (2Na$_2$HPO$_4$.12H$_2$O) to an aqueous solution obtained by dissolving iron phosphate heptahydrate (FeSO$_4$.7H$_2$O) in water and allowing the resulting mass to sit for a pre-determined time period. The synthesis reaction of iron(II) phosphate octahydrate may be represented by the following chemical formula:

$$3FeSO_4 \cdot 7H_2O + 2Na_2HPO_4 \cdot 12H_2O \rightarrow Fe_3(PO_4)_2 \cdot 8H_2O + 2Na_2SO_4 + 37H_2O$$

In iron(II) phosphate octahydrate, a certain amount of $Fe^{3+}$ from the synthesis process may be left over. If $Fe^{3+}$ is left in the material for synthesis, a trivalent Fe compound is generated by sintering to obstruct single-phase synthesis of the $LiFePO_4$-carbon composite material. It is therefore necessary to add a reducing agent to the starting materials prior to sintering and to reduce $Fe^{3+}$ contained in the starting materials at the time of firing to $Fe^{2+}$. However, there is a limitation to the capability of the reducing agent to reduce large amounts of Fe3+ to $Fe^{2+}$. If the amount of $Fe^{3+}$ present in the starting materials for synthesis is excessive, $Fe^{3+}$ may not be reduced in its entirety and some will remain in the final synthesized $LiFePO_4$ product. It is therefore desirable that the amount of $Fe^{3+}$ present in the iron(II) phosphate octahydrate used as a starting material be limited to 61 wt % or less. By limiting the amount of $Fe^{3+}$ present, single-phase synthesis of the $LiFePO_4$ product can be satisfactorily achieved without allowing $Fe^{3+}$ to be left over which can generate undesirable impurities in the final product.

It should be noted that, the longer the wait time in generating iron(H) phosphate octahydrate, the larger the $Fe^{3+}$ content in the generated product becomes. Accordingly, it is important to control any wait time by setting pre-determined time periods so that iron(II) phosphate octahydrate having an less $Fe^{3+}$ can be produced. The $Fe^{3+}$ content in the iron(II) phosphate octahydrate can then be measured by the Messbauer method.

The carbon material also acts as a reducing agent for reducing $Fe^{3+}$ to $Fe^{2+}$, at the time of sintering, even if $Fe^{2+}$ contained in iron(II) phosphate octahydrate starting material is oxidized to $Fe^{3+}$ by oxygen in the atmosphere or by the sintering process. Therefore, even if excessive $Fe^{3+}$ remains in the starting materials, impurities may be prevented by the carbon material thereby assuring single-phase synthesis of the $LiFePO_4$-carbon composite material of the present invention. Moreover, the carbon material acts as an antioxidant for preventing oxidation of $Fe^{2+}$ to $Fe^{3+}$. That is, the carbon material prevents oxidation by using oxygen present in atmosphere or in a firing oven prior to or during sintering.

Accordingly, the carbon material acts not only as an electrification agent for improving the electrical conductivity of the cathode active material 38 but also as a reducing agent and as an antioxidant. Since the carbon material is a component of the $LiFePO_4$-carbon composite material of the present invention, there is no necessity of removing the carbon material following the synthesis of the composite material thereby improving efficiency in the preparation of the $LiFePO_4$-carbon composite material. The carbon content per unit weight of the $LiFePO_4$-carbon composite material should not be less than 3 wt % in order to fully exploit the capacity and cyclic characteristics inherent in LiFePO4.

The next step in the method of the present invention is subjecting the mixture described above to a milling process wherein pulverization and mixing occur simultaneously. The milling process is conducted by powerful comminuting and mixing by a ball mill. The ball mill may be a planetary ball mill, a shaker ball mill or a mechano-fusion or any other ball mill suitable for the purpose. The milling process enables the starting materials and carbon material to be homogenously mixed. Moreover, comminution increases the specific surface area of the starting materials thereby increasing the contact area of the starting materials so as to expedite the synthesis reaction in the ensuing sintering step. Preferably, the mixture is milled sufficiently to produce a grain size distribution of 22% or less in terms of volumetric integration frequency wherein the particle size is not less than 3 μm. By setting the grain size distribution at this level, the starting materials will have a broad surface sufficient to realize surface activity for synthesis reaction. Thus, even if the sintering temperature is low and is below the melting point of the starting materials, i.e. 600° C., the reaction efficiency is high to permit the $LiFePO_4$-carbon composite material to be synthesized reliably in a single phase.

In the preferred method, the milling process is carried out so that the powder density of the $LiFePO_4$-carbon composite material will not be less than 2.2 $g/cm^2$. By comminuting the starting materials for synthesis so as to yield the aforementioned powder density, the contact area between $LiFePO_4$ and the carbon material can be increased to improve the electrical conductivity of the cathode active material 38. Thus, by milling the mixture containing the starting materials, it is possible to produce a cathode active material capable of realizing a high capacity in accordance with the present invention.

In the sintering step, the mixture milled in the milling step is sintered. By sintering the mixture, lithium phosphate is reacted with iron(H) phosphate octahydrate to synthesize $LiFePO_4$. The synthesis reaction of $LiFePO_4$ may be represented by the following reaction formula:

$$Li_3PO_4 + Fe_3(PO_4)_2 \cdot nH_2O \rightarrow 3 LiFePO_4 + nH_2O$$

where n denotes the number of hydrates and is equal to 0 for an anhydride. In the above chemical formula, $Li_3PO_4$ is reacted with $Fe_3(PO_4)_2$ or its hydrate $Fe_3(PO_4)_2 \cdot nH_2O$ where n denotes the number of hydrates. It will be appreciated by those skilled in the art that no by-product is yielded if $Fe_3(PO_4)_2$ is used as a starting material. On the other hand, if $Fe_3(PO_4)_2 \cdot nH_2O$ is used, water, which is non-toxic, is produced.

In prior art preparations, lithium carbonate, ammonium dihydrogen phosphate and iron acetate II are used as starting materials and are mixed at a pre-determined ratio and sintered to synthesize $LiFePO_4$ according to the reaction shown by the chemical formula:

$$Li_2CO_3 + 2Fe(CH_3COO)_2 + 2NH_4H_2PO_4 \rightarrow 2LiFePO_4 + CO_2 + H_2O + 2NH_3 + 4CH_3COOH$$

As may be seen from the above reaction formula, toxic by-products, such as ammonia or acetic acid, are generated upon sintering with the conventional synthesis method for $LiFePO_4$. Large-scale equipment, such as gas collector, is therefore required for processing these toxic by-products thereby raising the cost associated therewith. In addition, the yield of $LiFePO_4$ is lowered because these by-products are generated in large quantities.

According to the method of the present invention, wherein $Li_3PO_4$, $Fe_3(PO_4)_2$ or its hydrate $Fe_3(PO_4)_2 \cdot nH_2O$, wherein n denotes the number of hydrates, is used as the starting material, targeted $LiFePO_4$ can be produced without generating toxic by-products. In other words, safety in sintering may be appreciably improved as compared to the conventional manufacturing method. Moreover, while large-scale processing equipment has been required for processing toxic by-products in prior art methods, the manufacturing method of the present invention yields only water as a by-product thereby appreciably simplifying the processing step and reducing the size of the processing equipment required. The result is that the production cost can be appreciably lower than if toxic by-products have to be processed. Moreover, since the by-product is yielded only in small quantities, the yield of LiFePO$_4$ is significantly improved.

The preferred sintering temperature is 400-900° C., and more preferably about 600° C. If the sintering temperature is less than 400° C., neither the chemical reaction nor the crystallization process progresses far enough to remove impurities, such as Li$_3$PO$_4$, from the starting materials thereby preventing production of a homogeneous LiFePO$_4$ product. Conversely, if the sintering temperature exceeds 900° C., excessive crystallization results yielding LiFePO$_4$ particles that are coarse and without sufficient surface area thereby decreasing the contact area between LiFePO$_4$ and the carbon material. This decrease in contact area prevents sufficient discharge capacity in cell 10 to develop.

During sintering, the iron in the LiFePO$_4$-carbon composite material is in its bivalent state. At 600° C., the iron in the LiFePO$_4$-carbon composite material is promptly oxidized to Fe$^{3+}$ by oxygen in the sintering atmosphere in accordance with the following chemical formula:

$$6\text{LiFePO}_4 + 3/2\text{O}_2 \rightarrow 2\text{Li}_3\text{Fe}_2(\text{PO}_4)_3 + \text{Fe}_2\text{O}_3$$

As shown above, impurities, such as trivalent iron compounds, are also produced. These impurities obstruct single-phase synthesis of the LiFePO4-carbon composite material. Inert gases, such as nitrogen or argon, or reducing gases, such as hydrogen or carbon monoxide, are therefore used as the sintering atmosphere, and the oxygen concentration in the sintering atmosphere is prescribed to a range within which the iron in the LiFePO$_4$-carbon composite material is not oxidized, e.g., not larger than 1012 ppm (volume). By setting the oxygen concentration in the sintering atmosphere to 1012 ppm (volume) or less, iron is prevented from being oxidized even at a temperature of about 600° C. Single-phase synthesis of the LiFePO$_4$-carbon composite material may therefore be achieved. If the oxygen concentration in the sintering atmosphere is higher than 1012 ppm, the iron in the LiFePO$_4$-carbon composite material will oxidize to Fe$^{3+}$ and generate impurities that obstruct single-phase synthesis of the LiFePO$_4$-carbon composite material.

The take-out temperature of the sintered LiFePO$_4$-carbon composite material, that is, the temperature of the LiFePO$_4$-carbon composite material when exposed to the environment outside of the sintering atmosphere, is preferably less than 305° C. and, more preferably, less than 204° C. By setting the take-out temperature of the LiFePO$_4$-carbon composite material to 305° C. or less, the iron in the sintered LiFePO$_4$-carbon composite material is oxidized by oxygen in the outside environment which prevents impurities from being produced. If the sintered LiFePO$_4$-carbon composite material is removed from the sintering atmosphere before it has cooled sufficiently, the iron becomes oxidized by the outside environment thereby producing impurities. On the other hand, if the LiFePO$_4$-carbon composite material is cooled too much, the operating efficiency is also lowered. Thus, by setting the take-out temperature of the sintered LiFePO$_4$-carbon composite material to 305° C. or less, it is possible to prevent iron in the sintered LiFePO$_4$-carbon composite material from being oxidized by oxygen in the outside environment thereby preventing impurities from being generated. As a result, operation efficiency as well as desirable cell characteristics and high efficiency of the LiFePO$_4$-carbon composite material are maintained After sintering, the LiFePO$_4$-carbon composite material is cooled in a sintering furnace. The cooling method may be either spontaneous cooling or forced cooling. However, if a shorter cooling time, that is a higher operating efficiency, is envisaged, forced cooling is the preferred cooling method. During forced cooling, it is sufficient if either a gas mixture of oxygen and inert gases or inert gases alone are supplied to the sintering furnace so that the oxygen concentration in the sintering furnace will be not higher than the aforementioned preferred oxygen concentration, that is, 1012 ppm in volume or less.

In the foregoing embodiment, the carbon material is added prior to the milling step. In another embodiment of the present invention, the carbon material may be added after the milling step or after the sintering step. However, if the carbon material is added after the sintering step, the reducing effect or the oxidation-preventative effect during sintering cannot be obtained and it will be necessary to prevent excess Fe3+ from forming by some other means. Addition of the carbon material is therefore only useful for improving the electrical conductivity of the cell. Moreover, one skilled in the art will appreciate that, if the carbon material is added after the sintering step, the product synthesized on sintering is not the LiFePO$_4$-carbon composite material described above, but is merely LiFePO$_4$. Accordingly, after the carbon material is added to the LiFePO$_4$ after the sintering step, the mixture must then be milled to produce the LiFePO$_4$ of the present invention. During this second milling step, the carbon material added to the LiFePO$_4$ is comminuted and becomes more susceptible to attachment to the surface of LiFePO$_4$. Moreover, this second milling step allows the LiFePO$_4$ and the carbon material to be mixed sufficiently enough to permit the comminuted carbon material to uniformly attach to the surface of the LiFePO$_4$. Accordingly, even when the carbon material is added after sintering, it is possible to obtain a product similar to the one obtained by addition of a carbon material prior to milling, that is, the LiFePO$_4$-carbon composite material, as well as to achieve the desired result similar to that described above.

A method for making the non-aqueous electrolyte cell 10 of the present invention, employing the LiFePO$_4$-carbon composite material, prepared as described above, as cathode active material 38 is also disclosed. During preparation of cathode 22, cathode active material 38, namely, the LiFePO$_4$-carbon composite material, and any suitable binder are dispersed in a solvent to prepare a slurried cathode mixture. The slurried cathode mixture is applied to faces 34 and 36 of cathode current collector 28 except at exposed portion 40 on inner face 36 wherein current collector 28 remains exposed. The slurried cathode mixture is then dried in situ to form a generally uniform layer or coat of cathode active material 38.

In the foregoing embodiment of the present invention, the LiFePO$_4$-carbon composite material is used as cathode active material 38. The present invention, however, is not limited to this embodiment. Another embodiment contemplated by the present invention provides for the use LiFePO$_4$ alone as cathode active material 38. As cathode active mixture 38, a third embodiment uses an olivinic structure having the formula Li$_x$Fe$_{1-y}$M$_y$PO$_4$, wherein $0.05 \leq x \leq 1.2$ and $0 \leq y \leq 0.8$, wherein M is at least one element selected from the group consisting of Mn, Cr, Co, Cu, Ni, V, Mo, Ti, Zn, Al, Ga, Mg, B and Nb, and wherein this compound is not LiFePO$_4$. This compound may be used alone or in combination with other materials. Examples of this compound include, but are not limited to, LiFe$_{0.2}$Mn$_{0.8}$PO$_4$, LiFe$_{0.2}$Cr$_{0.8}$PO$_4$, LiFe$_{0.2}$Co$_{0.8}$PO$_4$, LiFe$_{0.2}$Cu$_{0.8}$PO$_4$, $LiFe_{0.2}Ni_{0.8}PO_4$, $LiFe_{0.25}V_{0.75}PO_4$, $LiFe_{0.25}Mo_{0.75}PO_4$, $LiFe_{0.25}Ti_{0.75}PO_4$, $LiFe_{0.3}Zn_{0.7}PO_4$, $LiFe_{0.3}Al_{0.7}PO_4$, $LiFe_{0.3}Ga_{0.7}PO_4$, $LiFe_{0.25}Mg_{0.75}PO_4$, $LiFe_{0.25}B_{0.75}PO_4$ and $LiFe_{0.25}Nb_{0.75}PO_4$.

To prepare anode 24, anode active material 58 and any suitable binder known to those skilled in the art are dispersed in a solvent to prepare a slurried anode mixture. This slurried anode mixture is applied to faces 54 and 56 of anode current collector 48 except at exposed portion 60 on outer face 54 wherein current collector 48 remains exposed. The anode mixture is then dried in situ to form a generally uniform layer or coat anode active material 58.

Cathode 22 and anode 24, thus prepared, are then layered together with separator 26 therebetween such that cathode 22 is disposed on the outside, that is, closest to walls 14, 16, 18 and 20. The combined layers of cathode 22, separator 26, and anode 24 are then spirally-rolled or coiled a plurality of times starting with beginning ends 30 and 50 and ending with terminating ends 32 and 52 such that beginning ends 30 and 50 such that beginning ends 30 and 50 are disposed within core 44 and terminating ends 32 and 52 are exposed on the exterior of the coiled layers. The coiled layers of cathode 22, separator 26, and anode 24 are then inserted into casing 6 into which a non-aqueous electrolyte solution is charged. The non-aqeuous electrolyte solution is prepared by dissolving an electrolyte salt in a non-aqueous solvent. A lid is caulked to exterior of casing 6 via a gasket to complete the non-aqueous electrolyte cell 10 of the present invention. It will be appreciated by one skilled in the art, however, that this invention is not limited to any particular fabrication method.

EXAMPLES

Comparative Example 1

An $LiFePO_4$-carbon composite material and a binder were dispersed in a solvent to prepare a slurried cathode mixture. The cathode mixture was then applied to both faces of a cathode current collector in an amount sufficient to produce a coating thickness of 60 µm on one face of the current collector and a coating length of 30 cm on both faces of the current collector. An anode active material and a binder were dispersed in a solvent to prepare a slurried anode mixture which then was applied to the both faces of an anode current collector in an amount sufficient to form a coating 45 µm thick on one face of the current collector and having a length of 30 cm on both faces of the current collector. The cathode and anode were then wound together five turns with an electrolyte layer of 30 µm therebetween to prepare a cell device having a total thickness of 3.11 mm. This cell device was housed in a cell can 3.6 mm in thickness, 35 mm in width and 60 mm in length and sealed to fabricate a cell. In the cell of the present Comparative Example 1, no current collector exposed portion is provided and the cathode active material present on the inner face of the cathode faces the anode active material present on the outer face of the anode at the core of the cell while the cathode active material present on the outer face of the cathode faces the inner surface of the cell can.

Example 1

A cell was prepared under the same conditions as those for the cell of Comparative Example 1, except that the coating thickness on one face of the cathode current collector was 64.5 µm, the coating thickness on one face of the anode current collector was 48.5 µm, and the coating length of the cathode active material on the outer face of the cathode current collector, at the time of winding, was 23 cm from the cathode beginning end so that the total thickness of the layered and coiled cathode, anode and separator was 3.11 mm as in the cell of Comparative Example 1. In the cell of the present Example 1, the portion of the cathode current collector lying on the radially outermost periphery and facing the inner surface of the walls of the cell can, that is, the outer face of the current collector near the terminating end of the cathode current collector, is provided with a current collector exposing portion that is not coated with the cathode active material.

Example 2

A cell was prepared under the same conditions as those for the cell of the Comparative Example 1, except that the coating thickness of the cathode active material on one face of the cathode current collector was 65 µm, the coating thickness of the anode active material on one face of the anode current collector was 49 µm, and the coating length of the cathode active material on the inner face of the cathode current collector, at the time of winding, was 24 cm measured from the terminating end of the cathode current collector thereby providing a total thickness of 3.11 mm as in the cell of Comparative Example 1. In the cell of the present Example 2, however, the inner face of the anode current collector lying in the core or innermost portion of the cell toward the beginning end of the current collector wherein the inner face of the anode current collector faces itself is provided with a current collector exposing portion not coated with the anode active material.

Example 3

A cell was prepared under the same conditions as those for the cell of the Comparative Example 1, except that the coating thickness of the cathode active material on one face of the cathode current collector was 70.5 µm, the coating thickness of the anode active material on one face of the anode current collector was 53 µm, the coating length of the cathode active material on the outer face of the cathode current collector, at the time of winding, was 23 cm measured from the beginning end of the cathode current collector, and the coating length of the anode active material on the inner face of the anode current collector, at the time of winding, was 24 cm measured from the terminating end of the anode current collector, so that the total thickness of the cell device will be 3.11 mm as in the cell of Comparative Example 1. In the cell of the present Example 3, however, the outer face of the cathode current collector lying at the radially outermost periphery of the cell device facing the inner surface of the cell can walls near the terminating end of the cathode current collector is provided with an exposed portion not coated with the cathode active material. Further, the inner face of the anode current collector lying in the core or innermost portion of the cell toward the beginning end of the current collector wherein the inner face of the anode current collector faces itself is provided with a current collector exposing portion not coated with the anode active material.

Example 4

A cell was prepared in the same way as in Example 1, except a separator was used between the cathode and anode instead of an electrolyte layer. The separator used was 30 μm thick and the electrolyte solution was charged into the cell can.

Comparative Example 2

An LiFePO$_4$-carbon composite material and a binder were dispersed in a solvent to prepare a slurried cathode mixture. The cathode mixture was then applied to both faces of a cathode current collector in an amount sufficient to produce a coating thickness of 60 μm on one face of the current collector and a coating length of 35 cm on both faces of the current collector. An anode active material and a binder were dispersed in a solvent to prepare a slurried anode mixture which then was applied to the both faces of an anode current collector in an amount sufficient to form a coating 45 μm thick on one face of the current collector and having a length of 35 cm on both faces of the current collector. The cathode and anode were then wound together six times with an electrolyte layer of 30 μm therebetween to prepare a cell device having a total thickness of 3.71 mm. This cell device was housed in an exterior multi-layered laminate film. In the cell of the present Comparative Example 2, no current collector exposed portion is provided and the cathode active material present on the inner face of the cathode faces the anode active material present on the outer face of the anode current collector at the core of the cell while the cathode active material present on the outer face of the cathode faces the inner surface of the cell can.

Example 5

A cell was prepared under the same conditions as those for the cell of the Comparative Example 2, except that the coating length of the cathode active material on the outer face of the cathode current collector was 29 cm measured from the beginning end of the cathode current collector, and that the total thickness of the cell device was 3.56 mm. In the cell of the present Example 5, the outer face of the cathode current collector lying at the radially outermost periphery of the cell device facing the inner surface of the cell can walls near the terminating end of the cathode current collector is provided with an exposed portion not coated with the cathode active material.

Example 6

A cell was prepared under the same conditions as those for the cell of the Comparative Example 2, except that the coating length of the anode active material on the inner face of the anode current collector was 30 cm and that the total thickness of the cell device was 3.53 mm. In the cell of the present Example 6, the inner face of the anode current collector lying in the core or innermost portion of the cell toward the beginning end of the current collector wherein the inner face of the anode current collector faces itself is provided with a current collector exposing portion not coated with the anode active material.

Example 7

A cell was prepared under the same conditions as those for the cell of the Comparative Example 2, except that the coating length of the cathode active material on the inner face of the cathode current collector was 29 cm measured from the beginning end of the cathode current collector, and the coating length of the anode active material on the inner face of the anode current collector, at the time of winding, was 30 cm measured from the terminating end of the anode current collector, with the total thickness of the cell device being 3.38 mm. In the cell of the present Example 7, the outer face of the cathode current collector lying at the radially outermost periphery of the cell device facing the inner surface of the cell can walls near the terminating end of the cathode current collector is provided with an exposed portion not coated with the cathode active material. Further, the inner face of the anode current collector lying in the core or innermost portion of the cell toward the beginning end of the current collector wherein the inner face of the anode current collector faces itself is provided with a current collector exposing portion not coated with the anode active material.

Example 8

A cell was prepared in the same way as in Example 7 except that the cathode and anode were provided in an exterior film with a separator 30 μm thick therebetween instead of the electrolyte layer between the cathode and anode, and that the electrolyte solution was charged.

Testing Results

The cells of the Comparative Examples 1 and 2 and cells of Examples 1 to 8 were evaluated as to their electrical capacity, outer shape, and cyclic characteristics. The results are shown in Tables 1 and 2.

TABLE 1

| Example | Electrolyte | Current collector exposing portion | # of turns | Device thickness (mm) | Constant volume exterior material |
| --- | --- | --- | --- | --- | --- |
| Comp. Ex. 1 | solid electrolyte | none | 5 | 3.11 | OK |
| Ex. 1 | | on radially outer most end of cathode | 5 | 3.11 | OK |
| Ex. 2 | solid electrolyte | on radially outer most end of anode | 5 | 3.11 | OK |
| Ex. 3 | solid electrolyte | on radially outer most side of cathode + on radially inner most side of anode | 5 | 3.11 | OK |
| Ex. 4 | non-aqueous electrolyte | on radially outer most side of cathode + on radially inner most side of anode | 5 | 3.12 | OK |

TABLE 1-continued

| Example | Electrolyte | Current collector exposing portion | # of turns | Device thickness (mm) | Constant volume exterior material |
|---|---|---|---|---|---|
| Comp. Ex. 2 | solid electrolyte | None | 6 | 3.71 | NG |
| Ex. 5 | solid electrolyte | on radially outer most end of cathode | 6 | 3.56 | OK |
| Ex. 6 | solid electrolyte | on radially outer most end of anode | 6 | 3.53 | OK |
| Ex. 7 | solid electrolyte | on radially outer most side of cathode + on radially inner most side of anode | 6 | 3.38 | OK |
| Ex. 8 | non-aqueous electrolyte | on radially outer most side of cathode + on radially inner most side of anode | 6 | 3.39 | OK |

TABLE 2

| | Rate of thickness reduction (%) | Electrical capacity mAh | Increasing ratio (%) | Electrical capacity density | Increasing ratio (%) | Inner shorting ratio (after 300 cycles) (%) |
|---|---|---|---|---|---|---|
| Comp. Ex. 1 | 100 | 646 | 100 | 132 | 100 | 28% |
| Ex. 1 | 100 | 689 | 107 | 144 | 109 | 4% |
| Ex. 2 | 100 | 693 | 107 | 144 | 110 | 7% |
| Ex. 3 | 100 | 745 | 115 | 155 | 118 | 0% |
| Ex. 4 | 100 | 744 | 115 | 155 | 118 | 0% |
| Comp. Ex. 2 | 100 | 751 | 116 | 132 | 100 | 23% |
| Ex. 5 | 96 | 752 | 116 | 139 | 106 | 3% |
| Ex. 6 | 95 | 751 | 116 | 139 | 106 | 5% |
| Ex. 7 | 91 | 753 | 117 | 148 | 112 | 0% |
| Ex. 8 | 91 | 752 | 117 | 147 | 112 | 0% |

First, the electrical capacities of the cells of Comparative Example 1 and Examples 1-4 were compared against one another. The cells of Examples 1 to 4, as compared to the cell of the Comparative Example 1 in which active materials were coated on the entire current collector surfaces and no current collector exposing portions were provided, the layer of the active materials of the portions contributing to the cell reaction could be increased in thickness, in an amount corresponding to the elimination of the layers of the active materials not contributing to the cell reaction by providing the current collector exposing portions, with the total thickness of the cell devices remaining equivalent to that of the cell of the Comparative Example 1. The result is that the electrical capacity of the cells of the Examples 1 to 4 was approximately 690 mAh to 750 mAh, which is higher than the electrical capacity of the cell of the Comparative Example 1 which was 646 mAh. Specifically, the electrical capacity of the cell of Example 1, in which the cathode had a current collector exposing portion, was increased to 107%. The electrical capacity of the cell of the Example 2, in which the anode had a current collector exposing portion, was increased to 107%. The electrical capacity of the cells of Examples 3 and 4, in which both the cathode and anode had current collector exposing portions, was increased to 115%.

If, in the device structure of the Comparative Examples, the number of turns is increased to six, the device thickness is equal to that of the Comparative Example 2, namely 3.71 mm, so that the cell cannot be held in the cell can 3.6 mm in thickness as used in Comparative Example 1 and Examples 1-4. Conversely, with the device structure of the Comparative Examples, if the active material is coated to a coating thickness similar to that of Comparative Example 1, and the number of turns is increased to 6, the total device thickness is of the same values as those of Examples 5-8. This, with the device structures of the Examples 1 to 8, the total device thickness was less than 3.6 mm, thus indicating that the electrical capacity can be increased by increasing the number of turns.

Moreover, since the electrical capacity increase was similar in the cells of Examples 3 and 4, it may be seen that the electrical capacity may be increased by employing the device structure of Examples 1-8. This is true not only in the case where the cathode was separated from the anode by a separator with the use of a liquid electrolyte but also where a solid electrolyte was used. It may also be seen that similar favorable effects were achieved where the cathode and anode were separated from each other by both an electrolyte layer and the separator.

The cells of Comparative Example 2 and Examples 5 and 6 were compared to one another to evaluate the outer shape. It is noted that, since the total thickness of the device is directly reflected by total cell thickness, if the multi-layered laminate film is used as the exterior material, the outer shape was evaluated based on the thickness of the cell device.

With the cells of the Examples 5 to 8, as compared to the cells of the Comparative Example 2, in which an active material is coated on the entire surfaces of the current collectors of the cathode and the anode, with there being no current collector exposing portion, the total device thickness can be reduced, by providing the current collector exposing portion, for eliminating the layer of the active material not contributing to the cell reaction, as the electrical capacity is maintained at an equivalent value to that of the cell of the Comparative Example 2. The result is that, while the total device thickness of the cell of the Comparative Example 2 is 3.771 mm, the total device thickness of the cell of the Example 5 is 3.56 mm, with the thickness reducing ratio being 96%, the total device thickness of the cell of the Example 6 is 3.53 mm, with the thickness reducing ratio being 95%, the total device thickness of the cell of the Example 7 is 3.38 mm, with the thickness reducing ratio being 91% and the total device thickness of the cell of the Example 8 is 3.39 mm, with the thickness reducing ratio being 91%, thus realizing the reduced cell thickness. In this case, it may be seen that the cells of Examples 5 to 8 are higher in electrical capacity density per unit volume than the cell of the Comparative Example 2, even though the Examples 5 to 8 and the Comparative Example 2 are of approximately equal electrical capacity.

Since the thickness reducing ratio is similar for Examples 7 and 8, it may be seen that the reduction in size and thickness of the cell may be realized by employing the device structure shown in the Examples 1 to 8, no matter whether the cathode and anode materials are separated from each other using a liquid electrolyte or using a solid electrolyte. It follows from this that similar favorable results may be achieved when the cathode and anode materials are separated from each other using both the electrolyte layer and the separator.

100 test cells of each of Comparative Examples 1 and 2 and the Examples 1 to 8 were prepared and cyclic characteristics thereof were evaluated. Since inner shorting was responsible for the electrical capacity of the test cells after 300 cycles of charging/discharging falling to not higher than 50% of the initial capacity, the inner shorting ratio was found from the "number of inner shorting×100/100 (number of test cells)" and the values thus obtained were used to evaluate the cyclic characteristics.

In the cells of Comparative Examples 1 and 2, in which the active material is coated on the entire surface of the current collector, the inner shorting ratio is not less than 20%, whereas, in the cells of Examples 1, 2, 5 and 6, in which the current collector exposing portion is provided in the cathode or in the anode, the inner shorting ratio is decreased to 10% or less. Additionally, with the cells of the Examples 3, 4, 7 and 8, in which the current collector exposing portions are provided in both the cathode and anode, the inner shorting ratio is 0%. This may be ascribed to the fact that if, in the electrodes of the cathode and anode, the stress due to volumetric changes of the electrode portions contributing to the charging/discharging cell reaction is applied to the electrode portions not contributing to the cell reaction and accumulated, the active material is detached from the current collector to fall off to cause inner shorting in the case of the cells of the Comparative Examples in which the active material is also coated on the stresses electrode portions not contributing to the cell reaction, whereas, in the cells of the Examples 1 to 8, no active material is coated on the stressed portion so that there is no detachment or falling off of the active material responsible for inner shorting. Thus, by not coating the active material on the electrode portion not contributing to the cell reaction, it is possible to prevent inner shorting from being produced to improve cyclic characteristics.

Since the inner shorting ratio is 0% in each of the Examples 3, 4, 7 and 8, it may be said that, by using the cell structure of the Examples 1 to 8, the cyclic characteristics of the cells can be improved no matter whether the cathode and anode are separated from each other by a separator using a liquid electrolyte or using a solid electrolyte. Also, it follows from this that similar favorable results may be derived in case of separating the cathode and anode using the electrolyte layer and a separator.

Further, cells of the Examples 9 to 22 were prepared and the outer shape as well as cyclic characteristics thereof were evaluated.

Example 9

A cell was prepared under the same conditions as that for the cell of Example 3 except using $LiFe_{0.2}Mn_{0.8}PO_4$ as the cathode active material in place of the $LiFePO_4$-carbon composite material.

Example 10

A cell was prepared under the same conditions as that for the cell of Example 3 except using $LiFe_{0.2}Cr_{0.8}PO_4$ as the cathode active material in place of the $LiFePO_4$-carbon composite material.

Example 11

A cell was prepared under the same conditions as that for the cell of Example 3 except using $LiFe_{0.2}CO_{0.8}PO_4$ as the cathode active material in place of the $LiFePO_4$-carbon composite material.

Example 12

A cell was prepared under the same conditions as that for the cell of Example 3 except using $LiFe_{0.2}Cu_{0.8}PO_4$ as the cathode active material in place of the $LiFePO_4$-carbon composite material.

Example 13

A cell was prepared under the same conditions as that for the cell of Example 3 except using $LiFe_{0.2}Ni_{0.8}PO_4$ as the cathode active material in place of the $LiFePO_4$-carbon composite material.

Example 14

A cell was prepared under the same conditions as that for the cell of Example 3 except using $LiFe_{0.25}V_{0.75}PO_4$ as the cathode active material in place of the $LiFePO_4$-carbon composite material.

Example 15

A cell was prepared under the same conditions as that for the cell of Example 3 except using $LiFe_{0.25}Mo_{0.75}PO_4$ as the cathode active material in place of the $LiFePO_4$-carbon composite material.

Example 16

A cell was prepared under the same conditions as that for the cell of Example 3 except using $LiFe_{0.25}Ti_{0.75}PO_4$ as the cathode active material in place of the $LiFePO_4$-carbon composite material.

Example 17

A cell was prepared under the same conditions as that for the cell of Example 3 except using $LiFe_{0.3}Zn_{0.7}PO_4$ as the cathode active material in place of the $LiFePO_4$-carbon composite material.

Example 18

A cell was prepared under the same conditions as that for the cell of Example 3 except using $LiFe_{0.3}Al_{0.7}PO_4$ as the cathode active material in place of the $LiFePO_4$-carbon composite material.

Example 19

A cell was prepared under the same conditions as that for the cell of Example 3 except using $LiFe_{0.3}Ga_{0.7}PO_4$ as the cathode active material in place of the $LiFePO_4$-carbon composite material.

Example 20

A cell was prepared under the same conditions as that for the cell of Example 3 except using $LiFe_{0.25}Mg_{0.75}PO_4$ as the cathode active material in place of the $LiFePO_4$-carbon composite material.

Example 21

A cell was prepared under the same conditions as that for the cell of Example 3 except using $LiFe_{0.25}B_{0.75}PO_4$ as the cathode active material in place of the $LiFePO_4$-carbon composite material.

Example 22

A cell was prepared under the same conditions as that for the cell of Example 3 except using $LiFe_{0.25}Nb_{0.75}PO_4$ as the cathode active material in place of the $LiFePO_4$-carbon composite material.

Testing Results

The cells of Examples 9-22 were evaluated for electrical capacity, outer shape and cyclic characteristics in a manner similar to the testing of the cells of Examples 1-8. It was verified that results were favorable and comparable to those of the Example 3 employing $LiFePO_4$ as the cathode active material.

What is claimed is:

1. A non-aqueous electrolyte cell comprising:
an exterior material having an inner surface;
a cathode including a cathode current collector, a cathode active material, and an exposed portion, wherein said cathode active material is deposited on said cathode current collector except at said exposed portion, and wherein said cathode active material is a compound of an olivinic crystal structure having the formula $Li_xFe_{1-y}M_yPO_4$, wherein $0.05 \leq x \leq 1.2$ and $0 \leq y \leq 0.8$, wherein M is at least one element selected from the group consisting of Mn, Cr, Co, Cu, Ni, V, Mo, Ti, Zn, Al, Ga, Mg, B and Nb, said compound being used alone or in combination with other materials;
an anode including an anode current collector, an anode active material, and an exposed portion, wherein said anode active material is deposited on said anode current collector except at said exposed portion;
a separator for separating said cathode and said anode from each other; and
a non-aqueous electrolyte solution;
wherein said cathode, said separator, and said anode are layered and spirally-wound together to form a generally spirally-shaped cell device;
wherein the exposed portion comprises (i) a portion of cathode and anode current collector leads protruding from the spirally-wound portion and (ii) a non-protruding radially outermost spirally-wound portion of said cathode facing said inner surface of said exterior material,
wherein the exposed portion does not contribute to cell reaction;
wherein said cell device is encapsulated within said exterior material except for said protruding collector leads;
wherein the carbon material of said $LiFePO_4$ carbon composite material has a strength to area ratio of a diffraction line appearing at wave numbers 1570 to 1590 $cm^{-1}$ (G peak) to a diffraction line appearing at wave numbers 1340 to 1360 $cm^{-1}$ (D peak) of the Raman spectrum in Raman spectrometry, or A(D/G), equal to 0.3 or higher; and
wherein the carbon content per unit volume in said $LiFePO_4$ is not less than 3 wt %.

2. The non-aqueous electrolyte cell according to claim 1 wherein said anode active material is capable of doping and undoping lithium.

3. The non-aqueous electrolyte cell according to claim 1 wherein said cathode active material is a $LiFePO_4$ carbon composite material comprising said compound and a carbon material.

4. The non-aqueous electrolyte cell according to claim 3 wherein the powder density of said $LiFePO_4$ carbon composite material not less than 2.2 $g/cm^3$.

5. The non-aqueous electrolyte cell according to claim 3 wherein the Bullnauer Emmet Teller specific surface area of said $LiFePO_4$ carbon composite material is not less than 10.3 $m^2/g$.

6. The non-aqueous electrolyte cell according to claim 3 wherein the first-order particle size of said $LiFePO_4$ carbon composite material is not larger than 3.1 μm.

7. A solid electrolyte cell comprising:
a laminate film having an inner surface;
a cathode including a cathode current collector, a cathode active material, and an exposed portion, wherein said cathode active material is deposited on said cathode current collector except at said exposed portion, and wherein said cathode active material is a compound of an olivinic crystal structure having the formula $Li_xFe_{1-y}M_yPO_4$, wherein $0.05 \leq x \leq 1.2$ and $0 \leq y \leq 0.8$, and wherein M is at least one element selected from the group consisting of Mn, Cr, Co, Cu, Ni, V, Mo, Ti, Zn, Al, Ga, Mg, B and Nb, said compound being used alone or in combination with other materials;
an anode including an anode current collector, an anode active material, and an exposed portion, wherein said anode active material is deposited on said anode current collector except at said exposed portion; and
a solid electrolyte;
wherein said cathode and said anode are layered and coiled together to form a spirally-shaped cell device;
wherein the exposed portion comprises (i) a portion of cathode and anode current collector leads protruding from the spirally-wound portion and (ii) a non-protruding radially outermost spirally-wound portion of said cathode facing said inner surface of said exterior material;
wherein the exposed portion does not contribute to cell reaction;
wherein said cell device is encapsulated by said laminate film except for said protruding collector leads;
wherein the carbon material of said $LiFePO_4$ carbon composite material has a strength to area ratio of a diffraction line appearing at wave numbers 1570 to 1590 $cm^{-1}$ (G peak) to a diffraction line appearing at wave numbers 1340 to 1360 cm$^{-1}$ (D peak) of the Raman spectrum in Raman spectrometry, A(D/G), equal to 0.3 or higher; and wherein the carbon content per unit volume in said LiFePO$_4$ carbon composite material is not less than 3 wt %.

8. The solid electrolyte cell according to claim 7 wherein a separator is provided between said cathode and said anode.

9. The solid electrolyte cell according to claim 7 wherein said anode active material is capable of doping and undoping lithium.

10. The solid electrolyte cell according to claim 7 wherein said cathode active material is a LiFePO$_4$ carbon composite material comprising said compound and a carbon material.

11. The solid electrolyte cell according to claim 10 wherein the powder density of said LiFePO$_4$ carbon composite material is not less than 2.2 g/cm$^3$.

12. The solid electrolyte cell according to claim 10 wherein the Bullnauer Emmet Teller specific surface area of said LiFePO$_4$ carbon composite material is not less than 10.3 m$^2$/g.

13. The solid electrolyte cell according to claim 10 wherein the first-order particle size of said LiFePO$_4$ carbon composite material is not larger than 3.1 μm.

14. The non-aqueous electrolyte cell according to claim 7 wherein the exposed portion further comprises non-protruding self-facing portions of a radially innermost spirally-wound portion of said anode.

15. The non-aqueous electrolyte cell according to claim 1 wherein the exposed portion further comprises non-protruding self-facing portions of a radially innermost spirally-wound portion of said anode.

16. A non-aqueous electrolyte cell comprising:

an exterior material having an inner surface;

a cathode including a cathode current collector, a cathode active material, and an exposed portion, wherein said cathode active material is deposited on said cathode current collector except at said exposed portion, and wherein said cathode active material is a compound of an olivinic crystal structure having the formula Li$_x$Fe$_{1-y}$M$_y$PO$_4$, wherein $0.05 \leq x \leq 1.2$ and $0 \leq y \leq 0.8$, wherein M is at least one element selected from the group consisting of Mn, Cr, Co, Cu, Ni, V, Mo, Ti, Zn, Al, Ga, Mg, B and Nb, said compound being used alone or in combination with other materials;

an anode including an anode current collector, an anode active material, and an exposed portion, wherein said anode active material is deposited on said anode current collector except at said exposed portion;

a separator for separating said cathode and said anode from each other; and a non-aqueous electrolyte solution;

wherein said cathode, said separator, and said anode are layered and spirally-wound together to form a generally spirally-shaped cell device;

wherein the exposed portion comprises (i) a portion of cathode and anode current collector leads protruding from the spirally-wound portion and (ii) a non-protruding radially outermost spirally-wound portion of said cathode facing said inner surface of said exterior material; and (iii) a non-protruding self-facing portion of a radially innermost spirally-wound portion of said anode;

wherein the exposed portion does not contribute to cell reaction;

wherein said cell device is substantially encapsulated within said exterior material except for said protruding collector leads;

wherein the carbon material of said LiFePO$_4$ carbon composite material has a strength to area ratio of a diffraction line appearing at wave numbers 1570 to 1590 cm$^{-1}$ (G peak) to a diffraction line appearing at wave numbers 1340 to 1360 cm$^{-1}$ (D peak) of the Raman spectrum in Raman spectrometry, or A(D/G), equal to 0.3 or higher; and wherein the carbon content per unit volume in said LiFePO$_4$ is not less than 3 wt %.

17. A solid electrolyte cell comprising:

a laminate film having an inner surface;

a cathode including a cathode current collector, a cathode active material, and an exposed portion, wherein said cathode active material is deposited on said cathode current collector except at said exposed portion, and wherein said cathode active material is a compound of an olivinic crystal structure having the formula Li$_x$Fe$_{1-y}$M$_y$PO$_4$, wherein $0.05 \leq x \leq 1.2$ and $0 \leq y \leq 0.8$, and wherein M is at least one element selected from the group consisting of Mn, Cr, Co, Cu, Ni, V, Mo, Ti, Zn, Al, Ga, Mg, B and Nb, said compound being used alone or in combination with other materials;

an anode including an anode current collector, an anode active material, and an exposed portion, wherein said anode active material is deposited on said anode current collector except at said exposed portion; and a solid electrolyte;

wherein said cathode and said anode are layered and coiled together to form a spirally-shaped cell device;

wherein the exposed portion comprises (i) a portion of cathode and anode current collector leads protruding from the spirally-wound portion and (ii) a non-protruding radially outermost spirally-wound portion of said cathode facing said inner surface of said exterior material; and (iii) a non-protruding self-facing portion of a radially innermost spirally-wound portion of said anode;

wherein the exposed portion does not contribute to cell reaction;

wherein said cell device is substantially encapsulated by said laminate film except for said protruding collector leads;

wherein the carbon material of said LiFePO$_4$ carbon composite material has a strength to area ratio of a diffraction line appearing at wave numbers 1570 to 1590 cm$^{-1}$ (G peak) to a diffraction line appearing at wave numbers 1340 to 1360 cm$^{-1}$ (D peak) of the Raman spectrum in Raman spectrometry, A(D/G), equal to 0.3 or higher; and wherein the carbon content per unit volume in said LiFePO$_4$ carbon composite material is not less than 3 wt %.

* * * * *